(12) United States Patent
Kristensson et al.

(10) Patent No.: US 8,456,300 B2
(45) Date of Patent: Jun. 4, 2013

(54) METHODS, ELECTRONIC DEVICES, AND COMPUTER PROGRAM PRODUCTS FOR GENERATING PRESENCE INFORMATION ASSOCIATED WITH A USER OF AN ELECTRONIC DEVICE BASED ON ENVIRONMENTAL INFORMATION

(75) Inventors: Andreas Kristensson, Lund (SE); Pär-Anders Aronsson, Klagshamn (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1513 days.

(21) Appl. No.: 11/746,302

(22) Filed: May 9, 2007

(65) Prior Publication Data

US 2008/0278312 A1    Nov. 13, 2008

(51) Int. Cl.
G08B 1/08    (2006.01)
H04B 1/38    (2006.01)
G06F 15/16    (2006.01)

(52) U.S. Cl.
USPC ............. 340/539.22; 340/539.11; 455/90.2; 455/90.3; 709/206

(58) Field of Classification Search
USPC .................................................. 340/539.22
See application file for complete search history.

(56) References Cited

U.S. PATENT DOCUMENTS

| | | | | |
|---|---|---|---|---|
| 6,127,945 | A * | 10/2000 | Mura-Smith | 340/988 |
| 6,978,136 | B2 * | 12/2005 | Jenniges et al. | 455/435.1 |
| 7,243,149 | B2 * | 7/2007 | Kelley et al. | 709/224 |
| 7,443,283 | B2 * | 10/2008 | Schmandt et al. | 340/407.1 |
| 7,487,214 | B2 * | 2/2009 | Qureshi et al. | 709/206 |
| 7,564,469 | B2 * | 7/2009 | Cohen | 345/632 |
| 2004/0176100 | A1 * | 9/2004 | Florkey et al. | 455/456.1 |
| 2005/0068167 | A1 * | 3/2005 | Boyer et al. | 340/531 |
| 2005/0153729 | A1 * | 7/2005 | Logan et al. | 455/550.1 |
| 2005/0184875 | A1 * | 8/2005 | Schmandt et al. | 340/573.1 |
| 2005/0228882 | A1 | 10/2005 | Watanabe et al. | |
| 2006/0030264 | A1 * | 2/2006 | Morris | 455/41.2 |
| 2006/0073795 | A1 * | 4/2006 | Mayblum et al. | 455/90.2 |
| 2006/0073843 | A1 * | 4/2006 | Aerrabotu et al. | 455/519 |
| 2006/0093998 | A1 * | 5/2006 | Vertegaal | 434/236 |
| 2006/0161379 | A1 * | 7/2006 | Ellenby et al. | 702/150 |
| 2006/0205394 | A1 | 9/2006 | Vesterinen | |
| 2007/0112922 | A1 * | 5/2007 | Kurata et al. | 709/206 |

(Continued)

FOREIGN PATENT DOCUMENTS

| | | | |
|---|---|---|---|
| EP | 05425356.2 | * | 5/2006 |
| EP | 1 732 300 A | | 12/2006 |
| GB | 2405768 A | * | 3/2005 |
| WO | WO 2006125579 A1 | * | 11/2006 |

OTHER PUBLICATIONS

International Search Authority International Search Report and Written Opinion for PCT Application PCT/EP2007/061880 mailed Mar. 18, 2008.

*Primary Examiner* — Daniel Wu
*Assistant Examiner* — Emily C Terrell
(74) *Attorney, Agent, or Firm* — Myers Bigel Sibley & Sajovec, P.A.

(57) ABSTRACT

An electronic device includes an environmental sensor that is configured to obtain information associated with an environment surrounding the electronic device and a presence client module that is configured to generate a presence indicator associated with a user of the electronic device based on the information associated with the environment surrounding the electronic device.

21 Claims, 3 Drawing Sheets

U.S. PATENT DOCUMENTS

| | | | |
|---|---|---|---|
| 2007/0265859 A1* | 11/2007 | Jachner | 705/1 |
| 2008/0058006 A1* | 3/2008 | Ladouceur | 455/556.1 |
| 2008/0098328 A1* | 4/2008 | Rollin et al. | 715/810 |
| 2008/0114848 A1* | 5/2008 | Lira | 709/206 |
| 2008/0168353 A1* | 7/2008 | Anzures et al. | 715/716 |
| 2008/0256445 A1* | 10/2008 | Olch et al. | 715/700 |
| 2008/0261564 A1* | 10/2008 | Logan | 455/413 |
| 2008/0263460 A1* | 10/2008 | Altberg et al. | 715/757 |
| 2008/0278312 A1* | 11/2008 | Kristensson et al. | 340/539.13 |
| 2009/0077181 A1* | 3/2009 | Chen | 709/206 |

* cited by examiner

METHODS, ELECTRONIC DEVICES, AND COMPUTER PROGRAM PRODUCTS FOR GENERATING PRESENCE INFORMATION ASSOCIATED WITH A USER OF AN ELECTRONIC DEVICE BASED ON ENVIRONMENTAL INFORMATION

BACKGROUND OF THE INVENTION

The present invention relates to electronic devices, and, more particularly, to methods, electronic devices, and computer program products for indicating presence information in an electronic device.

In an electronic device, presence information is a status indicator that conveys the ability and/or willingness of a user of the electronic device to communicate with another party. In some communication systems, a client running on an electronic device can provide presence information to a presence service, which stores the presence information as part of a personal availability record. This presence information can be made available to other potential communication partners to convey the user's availability for communication. Presence information is often used in applications, such as chat applications, Instant Messaging (IM) applications, Voice over Internet Protocol (VoIP) applications, and the like.

SUMMARY OF THE INVENTION

According to some embodiments of the present invention, an electronic device includes an environmental sensor that is configured to obtain information associated with an environment surrounding the electronic device and a presence client module that is configured to generate a presence indicator associated with a user of the electronic device based on the information associated with the environment surrounding the electronic device.

In other embodiments, the environmental sensor includes a movement detector that is configured to generate data that are indicative of movement of the electronic device.

In still other embodiments, the movement detector includes at least one accelerometer.

In still other embodiments, the movement detector further includes a gyroscope that is configured to generate data that are indicative of rotational movement of the electronic device.

In still other embodiments, the movement detector comprises a Global Positioning System (GPS) module.

In still other embodiments, the environmental sensor includes a microphone that is configured to capture audio information from the surrounding environment.

In still other embodiments, the environmental sensor includes a camera and/or a video recorder that is configured to capture graphic and/or video information from the surrounding environment.

In still other embodiments, the electronic device further includes at least one application module that is configured to publish the presence indicator such that the presence indicator is accessible by potential communication partners of the user.

In still other embodiments, the at least one application module includes an Instant Messaging (IM) module, a chat module, and/or a Second Life module.

In still other embodiments, the electronic device is a mobile terminal.

In further embodiments, an electronic device is operated by obtaining information associated with an environment surrounding the electronic device and generating a presence indicator associated with a riser of the electronic device based on the information associated with the environment surrounding the electronic device.

In still further embodiments, obtaining information associated with the environment includes using a movement detector to generate data that are indicative of movement of the electronic device.

In still further embodiments, the movement detector includes at least one accelerometer.

In still further embodiments, the movement detector further includes a gyroscope, which is used to generate data that are indicative of rotational movement of the electronic device.

In still farther embodiments, the movement detector includes a Global Positioning System (GPS) module.

In still further embodiments, obtaining information associated with the environment includes using a microphone to capture audio information from the surrounding environment.

In still further embodiments, obtaining information associated with the environment includes using a camera and/or a video recorder to capture graphic and/or video information from the surrounding environment.

In still further embodiments, the method further includes publishing the presence indicator such that the presence indicator is accessible by potential communication partners of the user.

In still further embodiments, publishing the presence indicator includes publishing the presence indicator using an Instant Messaging (IM) module, a chat module, and/or a Second Life module.

In still farther embodiments, the electronic device is a mobile terminal.

In other embodiments, a computer program product for operating an electronic device includes a computer readable storage medium having computer readable program code embodied therein. The computer readable program code includes computer readable program code configured to obtain information associated with an environment surrounding the electronic device, and computer readable program code configured to generate a presence indicator associated with a user of the electronic device based on the information associated with the environment surrounding the electronic device.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
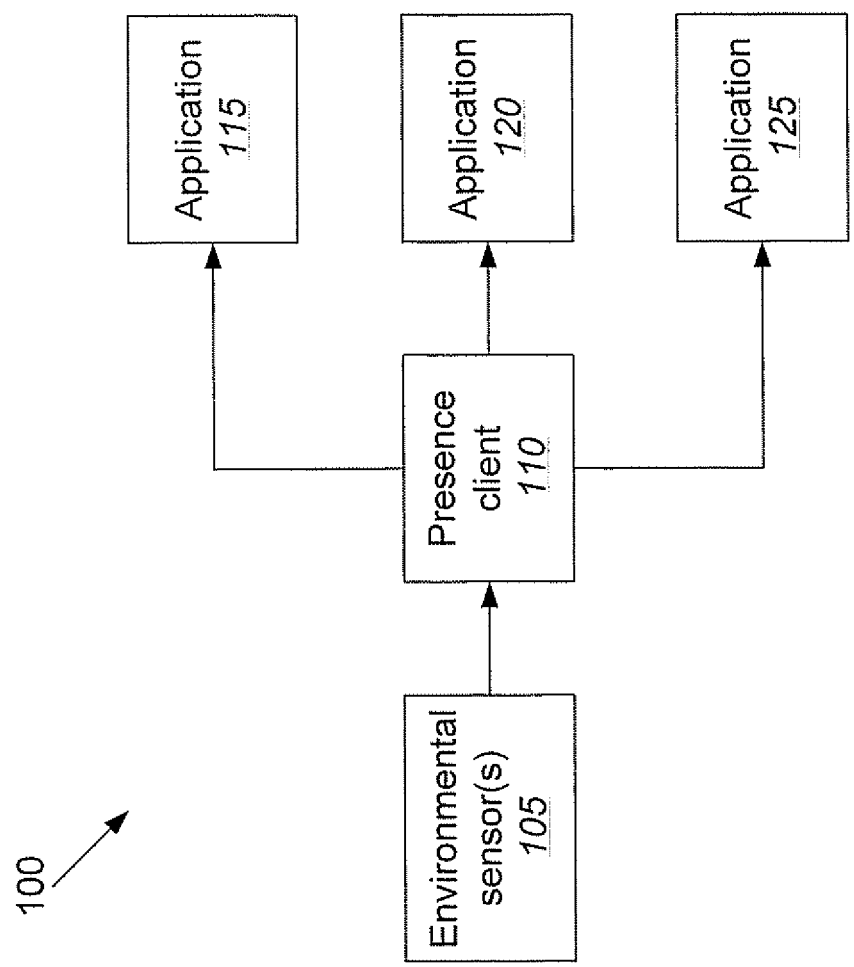
FIG. 1 is a block diagram that illustrates an electronic device that can generate presence information based on environmental information in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

For purposes of illustration, embodiments of the present invention are described herein in the context of a mobile terminal. It will be understood, however, that the present invention is not limited to such embodiments and may be embodied generally as an electronic device that can generate presence information based on environmental information.

In some embodiments of the present invention, an electronic device, such as a mobile terminal, can sense environmental information, which can be provided to a presence client and used to generate presence information associated with a user of the electronic device. In conventional applications, a user may manually set a presence state, which is then published to indicate the user's current availability. Example presence states may include "free to chat," "busy," "away momentarily," "do not disturb," and "out to lunch." The presence states may in some applications be accompanied by an indication of the user's mood and/or location. Embodiments of the present invention may be used to generate or select a presence indicator based on information sensed from the surrounding environment. For example, a movement detector may sense that the electronic device is in motion and may generate a presence indicator to indicate that the user is traveling. A microphone, camera, and/or video recorder may capture audio, graphic, and/or video information that indicates that a user, for example, is in a meeting, attending a sporting event, is eating, etc. which can then be used to select a presence indicator or annotate a presence indicator with the additional information. Such generated presence states, according to some embodiments of the present invention, may be used with applications such as, but not limited to, Instant Messaging (IM), chat, and/or Second Life.

Referring to FIG. 1, an electronic device 100 that can generate presence information based on environmental information, in accordance with some embodiments of the present invention, comprises one or more environmental sensors 105 that obtain information associated with the environment surrounding the electronic device and provide that information to a presence client module 110. The presence client module 110 is configured to generate a presence indicator associated with a user of the electronic device based on the environmental information obtained from the environmental sensor(s) 105. This presence indicator can then be provided to one or more applications 115, 120, and 125 which publish the presence indicator for access by potential communication partners of the user.

Figure 2:
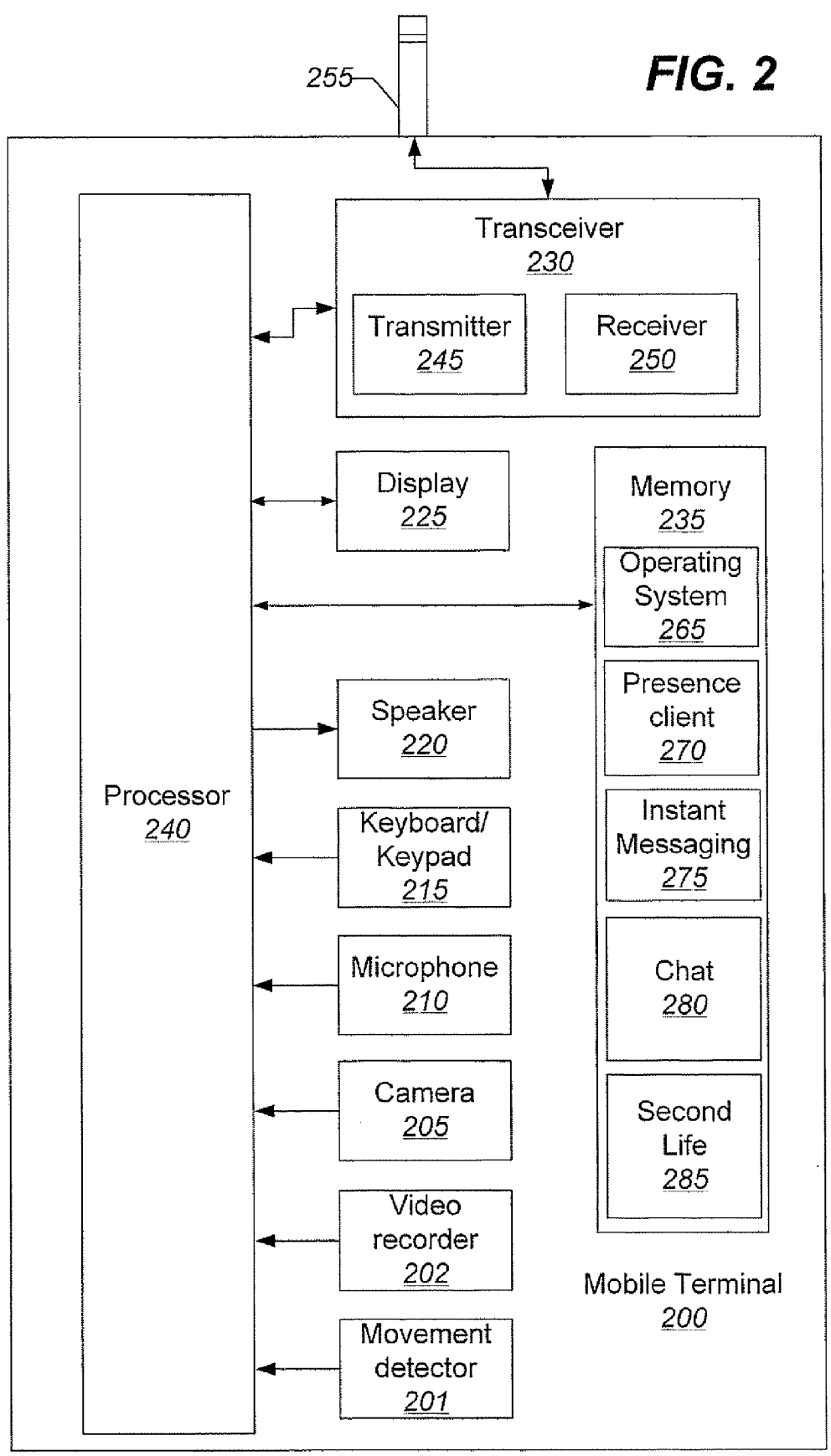
FIG. 2 is a block diagram that illustrates a mobile terminal that can generate presence information based on environmental information in accordance with some embodiments of the present invention.

Referring to FIG. 2, an exemplary mobile terminal 200, in accordance with some embodiments of the present invention, comprises a movement detector 201, a video recorder 202, a camera 205, a microphone 210, a keyboard/keypad 215, a speaker 220, a display 225, a transceiver 230, and a memory 235 that communicate with a processor 240. The transceiver 230 comprises a transmitter circuit 245 and a receiver circuit 250, which respectively transmit outgoing radio frequency signals to base station transceivers and receive incoming radio frequency signals from the base station transceivers via an antenna 255. The radio frequency signals transmitted between the mobile terminal 200 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The movement detector 201 may comprise one or more accelerometers, a gyroscope for detecting rotational movement, and/or a Global Positioning System (OPS) module. The movement detector 201, video recorder 202, camera 205, and/or microphone 210 may be referred to as environmental sensors that are configured to obtain information associated with the environment surrounding the mobile terminal 200. The foregoing components of the mobile terminal 100 may be included in many conventional mobile terminals and their functionality is generally known to those skilled in the art.

The processor 240 communicates with the memory 235 via an address/data bus. The processor 240 may be, for example, a commercially available or custom microprocessor. The memory 235 is representative of the one or more memory devices containing the software and data used to set a feature of the mobile terminal 200 based on an analysis of one or more characteristics of a user, such as a user's voice or expression, which may be indicative of the user's mood, in accordance with some embodiments of the present invention. The memory 235 may include, but is not limited to, the following types of devices: cache, ROM, PROM, EPROM, EEPROM, flash, SRAM, and DRAM.

As shown in FIG. 2, the memory 235 may contain up to five or more categories of software and/or data: the operating system 265, a presence client module 270, an Instant Messaging (IM) module 275, a chat module 280, and a Second Life module 285. The operating system 265 generally controls the operation of the mobile terminal 200. In particular, the operating system 265 may manage the mobile terminal's software and/or hardware resources and may coordinate execution of programs by the processor 240. The presence client module 270 may be configured to generate a presence indicator that is associated with a user of the mobile terminal 200.

In some embodiments, the presence client module 270 may receive environmental information from one or more of the environmental sensors on the mobile terminal 200, such as the movement detector 201, the video recorder 202, the camera 205, and/or the microphone 210. The presence client module 270 may include an Application Programming Interface (API), such as the Java JSR 256 Mobile Sensor API, to obtain the environmental data from the various environmental sensor modules. The presence client module 270 may use this environmental information to generate a particular presence indicator by selecting an indicator from a plurality of potential indicators and/or annotating a selected indicator with additional environmental information. For example, if the microphone 210 captures audio that indicates that the user is in a meeting, then the presence client module 270 may select a "busy" presence indicator that is annotated with the additional information "meeting."

The presence client module 275 may provide the generated presence indicator to one or more applications, such as the IM application 275, the chat application 280, and/or the Second Life application 285. The Second Life application 285 is a virtual world that enables participants to interact with each other through motional avatars. Participants can explore, meet each other, socialize, engage in individual and group activities, create, and trade items and services with each other. According to some embodiments of the present invention, a user may use actual environmental information to generate his/her presence in his/her virtual life created in the Second Life application 285. The applications 275, 280, and/or 285 may publish the presence indicator obtained from the presence client 270 so that the presence indicator can be accessed by potential communication partners of the user of the mobile terminal 200.

Although FIGS. 1 and 2 illustrate exemplary software and hardware architectures that may be used for generating presence information based on environmental information, it will be understood that the present invention is not limited to such a configuration but is intended to encompass any configuration capable of carrying out the operations described herein. For example, embodiments of the present invention are not limited to the particular environmental sensor modules and/or applications that may use the generated presence indicators discussed above with reference to FIG. 2. Moreover, the functionality of the hardware/software architecture of FIGS. 1 and 2 may be implemented as a single processor system, a multi-processor system, or even a network of stand-alone computer systems, in accordance with various embodiments of the present invention.

Computer program code for carrying out operations of devices and/or systems discussed above with respect to FIGS. 1 and 2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, mobile terminals, electronic devices, data processing systems, and/or computer program products in accordance with some embodiments of the invention.

These flowchart and/or block diagrams further illustrate exemplary operations of generating presence information based on environmental information, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
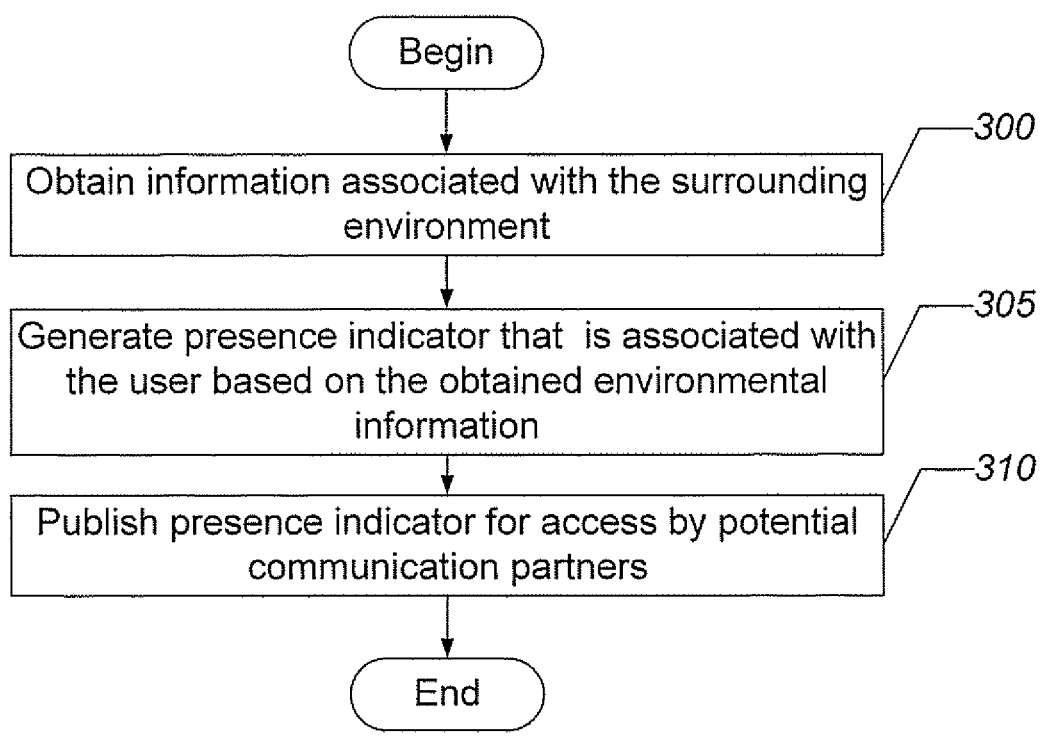
FIG. 3 is a flow chart that illustrates operations for generating presence information based on environmental information in accordance with some embodiments of the present invention.

Referring to FIG. 3, operations for generating presence information based on environmental information begin at block 300 where a presence client obtains information associated with the surrounding environment from, for example, one or more environmental sensors, such as a movement detector, microphone, camera, and/or video recorder. The presence client module generates a presence indicator that is associated with the user at block 305 based on the obtained environmental information. The generated presence indicator may be a conventional presence indicator that is supplemented based on the obtained environmental information, the presence indicator may be a newly defined indicator that is associated with the particular environmental information obtained, and/or the presence indicator may be selected from a group of presence indicators based on the obtained environmental information. At block 310, the generated presence indicator may be provided to one or more applications, such as an IM application, chat application and/or Second Life application, which may publish the presence indicator for access by potential communication partners of a user of an electronic device.

Advantageously, some embodiments of the present invention may allow devices, such as mobile terminals, to detect a user's environment and use that information to automatically generate a presence indicator that conveys the user's availability to communicate with others. Traditionally, a user would need to select a particular presence indicator manually to update others regarding the user's availability to communicate.

The flowchart of FIG. 3 illustrates the architecture, functionality, and operations of embodiments of methods, electronic devices, and/or computer program products for generating a presence indicator based on environmental information obtained from one or more environmental sensors. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. An electronic device, comprising:
    an environmental sensor that is configured to obtain graphic and/or video information associated with an environment surrounding the electronic device and a user of the electronic device; and
    a presence client module that is configured to generate a presence indicator associated with the user of the electronic device based on the information associated with the environment surrounding the electronic device and the user of the electronic device.

2. The electronic device of claim 1, wherein the environmental sensor comprises a movement detector that is configured to generate data that are indicative of movement of the electronic device.

3. The electronic device of claim 2, wherein the movement detector comprises at least one accelerometer.

4. The electronic device of claim 3, wherein the movement detector further comprises a gyroscope that is configured to generate data that are indicative of rotational movement of the electronic device.

5. The electronic device of claim 2, wherein the movement detector comprises a Global Positioning System (UPS) module.

6. The electronic device of claim 1, wherein the environmental sensor comprises a microphone that is configured to capture audio information from the surrounding environment.

7. The electronic device of claim 1, wherein the environmental sensor comprises a camera and/or a video recorder that is configured to capture graphic and/or video information from the surrounding environment.

8. The electronic device of claim 1, further comprising:
    at least one application module that is configured to publish the presence indicator such that the presence indicator is accessible by potential communication partners of the user.

9. The electronic device of claim 8, wherein the at least one application module comprises an Instant Messaging (IM) module, a chat module, and/or a Second Life module.

10. The electronic device of claim 1, wherein the electronic device is a mobile terminal.

11. A method of operating an electronic device, comprising:
    obtaining graphic and/or video information associated with an environment surrounding the electronic device and a user of the electronic device; and
    generating a presence indicator associated with the user of the electronic device based on the information associated with the environment surrounding the electronic device and the user of the electronic device.

12. The method of claim 11, wherein obtaining information associated with the environment comprises using a movement detector to generate data that are indicative of movement of the electronic device.

13. The method of claim 12, wherein the movement detector comprises at least one accelerometer.

14. The method of claim 13, wherein the movement detector further comprises a gyroscope, the method further comprising:
    using the gyroscope to generate data that are indicative of rotational movement of the electronic device.

15. The method of claim 12, wherein the movement detector comprises a Global Positioning System (GPS) module.

16. The method of claim 11, wherein obtaining information associated with the environment comprises using a microphone to capture audio information from the surrounding environment.

17. The method of claim 11, wherein obtaining information associated with the environment comprises using a camera and/or a video recorder to capture graphic and/or video information from the surrounding environment.

18. The method of claim 11, further comprising:
    publishing the presence indicator such that the presence indicator is accessible by potential communication partners of the user.

19. The method of claim 18, wherein publishing the presence indicator comprises publishing the presence indicator using an Instant Messaging (IM) module, a chat module, and/or a Second Life module.

20. The method of claim 11, wherein the electronic device is a mobile terminal.

21. A computer program product for operating an electronic device, comprising:
- a computer readable storage medium having computer readable program code embodied therein, the computer readable program code comprising:
- computer readable program code configured to obtain graphic and/or video information associated with an environment surrounding the electronic device and a user of the electronic device; and
- computer readable program code configured to generate a presence indicator associated with the user of the electronic device based on the information associated with the environment surrounding the electronic device and the user of the electronic device.

\* \* \* \* \*